Jan. 31, 1956 D. A. GUNN ET AL 2,732,843
SIGNAL HOLDERS
Filed May 6, 1952
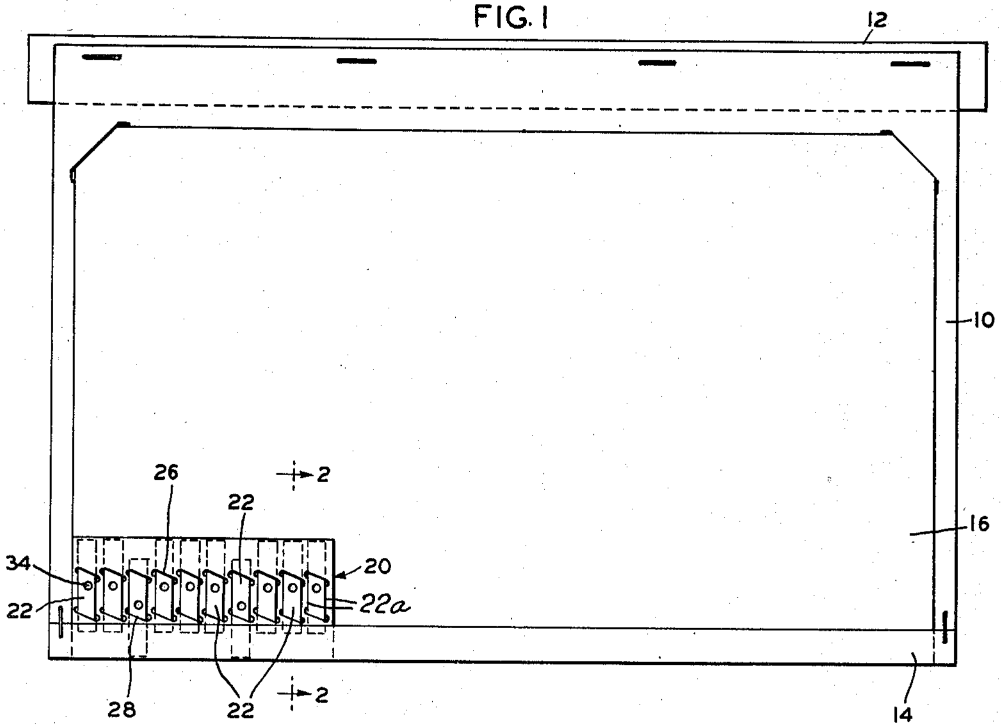
FIG. 2
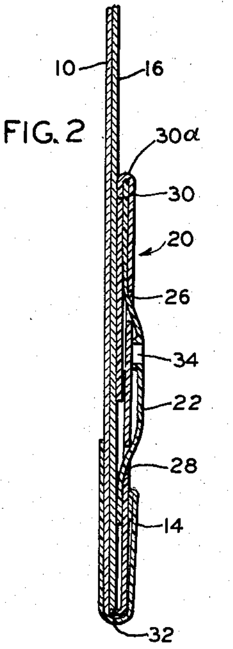
FIG. 3
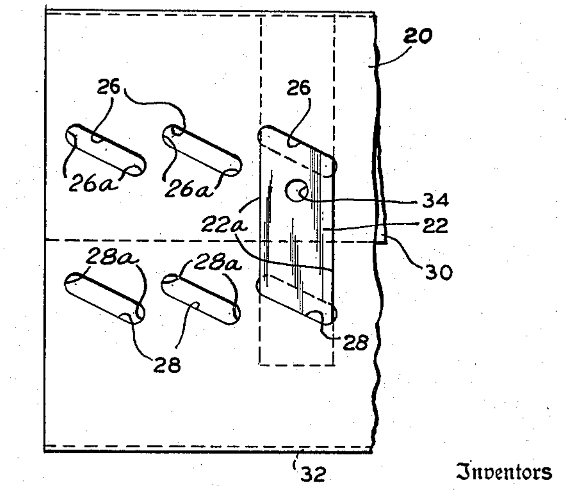
Inventors
CARL F. WOLTERS AND
DONALD A. GUNN
By [signature]
Attorney United States Patent Office 2,732,843

Patented Jan. 31, 1956

2,732,843

SIGNAL HOLDERS

Donald A. Gunn, Kenmore, N. Y., and Carl F. Wolters, New Canaan, Conn., assignors, by mesne assignments, to Sperry Rand Corporation, New York, N. Y., a corporation of Delaware Application May 6, 1952, Serial No. 286,368

2 Claims. (Cl. 129—16.7)

This invention relates generally to signalling devices and in particular to a visible index signalling device having a plurality of individually operable signals.

The invention comprises a signal holding strip formed from a sheet of transparent plastic material and having a marginal portion adapted for insertion under the transparent sheath of a conventional visible index card holder, overlaying the indexing margin of a visible index card in the holder. The signal strip is formed with a rearwardly folded portion on the lower edge that is adapted to engage the lower horizontal margin of an index card to retain the signalling device on said visible index card holder. The signal strip may be shorter than the card index margin or may overlay the entire margin. When the former is the case, the signal strip is longitudinally slidable along the indexing margin for signalling cooperation with selected portions thereof.

A plurality of signals are disposed in slidable transverse relation in said strip and are arranged to cooperate with the marginal indexing portions of the visible index card to provide signals readily discernible without movement of the cards. Each signal is preferably formed from transparent colored plastic material and is so assembled to the strip as to present an exposed portion that is engageable by a finger, pencil, stylus or the like for ease of movement of the signal to and from the visible index card margin. This transverse signal movement is utilized to visibly signal the relative status of data associated therewith.

In the drawings:

Fig. 1 is a front elevation of one embodiment of the invention disposed on a visible index card.

Fig. 2 is an enlarged cross section taken along line 2—2 of the embodiment of the invention illustrated in Fig. 1.

Fig. 3 is an enlarged fragmentary front elevation of the embodiment shown in Figs. 1 and 2 with two of the slidable signals omitted.

Referring to Figs. 1, 2 and 3, 10 generally designates an index card holder secured by stapling or the like at the upper margin to a supporting lug 12. Conventionally, a plurality of card holders are attached by lugs 12 to a tray, not shown, in offset overlapping relation whereby the horizontal lower tip portions thereof remain visible. A transparent sheath 14 is affixed to the visible portion of each holder 10.

A visible index card 16 is disposed in secured relation on card holder 10 with one margin thereof disposed within sheath 14. Positioned on a portion of the lower visible margin of index card 16 is a signalling device or strip designated as 20 and provided with a plurality of slidable signals 22. Signalling device 20 is preferably formed from clear transparent plastic, Celluloid or the like and has perforated therein two spaced rows of apertures comprising plural pairs of parallel spaced slots 26 and 28 angularly disposed relative to the horizontal margins of the holder. Slots 26 are arranged to form one row of apertures longitudinally disposed across device 20 while slots 28 form the second longitudinal row. The diagonal placement of each slot 26 and 28 in their respective rows provides a maximum quantity of holder material between adjacent slots and yet permits a minimum spacing between signals 22. Further, the offsetting of slots 26 and 28 provides an inherently strong connection betwen adjacent slots that would not otherwise be present if the adjacent slots were disposed in linear alignment. As shown in Figs. 2 and 3, strip 20 is folded to provide a rear flap-like guide and retaining section 30 disposed parallel to the face of said strip and extending substantially to terminate at a position intermediate each pair of slots 26, 28. The lower horizontal margin of strip 20 is turned rearwardly to provide a lip 32. Each signal 22 may be of substantially rectangular shape and have parallel sides 22*a* and may have centrally located aperture 34. The opposite ends of signal 22 are slidably inserted in a pair of slots 26 and 28.

Slots 26, 28 are of such size as to have shoulders 26*a*, 28*a* closely abut the parallel sides 22*a* of signals 22 and thereby guide signals 22 in their movement into and out of signalling relation with the visible index margin. A pencil, stylus or the like may be readily inserted in aperture 34 for moving the signal or it may be readily moved by the use of the rubber eraser tip of a conventional pencil. Slots 26, 28 are spaced so that the movement of the signals into or out of signalling position may be accomplished by a single stroke of the pencil, eraser or other instrument. The fold 30*a* of guide and retaining section 30 limits the upward movement of signal 22 while lip 32 limits the downward movement thereof. Further, lip 32 is arranged to engage the lower margin of index card 16 when said signalling assembly is inserted in sheath 14 and retains said assembly against displacement. With lip 32 disposed on the lower margin of visible index card 16, signalling assembly 20 is slidable transversely across said card margin to cooperate in signalling relation with any selected portion of the visible index card margin.

The signal holders shown and described above are mounted in the card holder 10 in front of the lower visible margin of the index card 16 so that one marginal portion of the signal holder will be engaged in the sheath over the visible margin of the index card. The remainder of the signal holder will extend above the sheath as shown in the drawings where access is provided to the central portion of each signal so that it may be engaged manually or with the use of an implement and manually moved in the holder between its opposite limits of movement. When moved downwardly as shown in Fig. 1, for example, the lower end of a signal 22 will lie over the visible margin of the index card for cooperative signaling purposes. These signals are selectively slidable into either signaling position or inoperative position at the upper limit of movement so as to give one or more signaling indications. Each signal may give an independent signaling indication or an arrangement may be made wherein the signals cooperate in their signaling or non-signaling positions according to the systems selected. This same cooperative signaling operation may be achieved with other forms of the signals shown and it will be understood that the signal holder may be of any length to include any desired number of slidable signals in adjacent relation. For example, the signal holder may extend entirely across index card 16 and have a series of signals adapted to be moved into signaling position overlying the entire margin of the index card. Where the signal holder is shorter than the length of the visible margin of the index card, the holder may be positioned at any location along the margin of the card for a desired signaling cooperation therewith.

The invention claimed is:

1. In a visible index having a card holder formed of a holder sheet hinged along one margin and having a transparent sheath embracing the opposite free marginal portion, means securing said sheath to said holder sheet, and an index card detachably mounted on said card holder with a visible marginal portion engaged in said sheath, the combination of a signal device formed of an elongated transparent sheet with a strip portion having a rearwardly directed flange on the lower edge engaged in said sheath and extending under the edge of said index card with the lower marginal portion of said strip portion covering the visible margin of said index card, said transparent sheet having a guide and retaining section in spaced parallel relation at the rear side of said strip portion overlying the upper marginal portion thereof and joined by a fold portion to the upper edge of said strip portion, said strip portion having a plurality of pairs of slots formed therein in longitudinally aligned relation on opposite sides of the center portion, a plurality of signal strips each slidably engaged in transversely extending relation to said strip portion in one pair of said slots with opposite ends on the rear side of said strip portion and the central portions overlying the front central section of said strip portion, the upper ends being slidably engaged and retained between said strip portion and said guide and retaining section and limited in movement in one direction thereby in non-signalling position, said rearwardly directed flange limiting movement of said signals in signalling position over the visible portion of said index card margin, and said index card detachably retaining said signal device in said sheath when engaged with said rearwardly directed flange.

2. A signal device for visible indexes comprising a strip of transparent sheet material formed with pairs of elongated apertures in an intermediate portion in longitudinal rows, corresponding slots of adjacent pairs having adjacent ends offset and forming signal guiding shoulders on the strip at the ends of said apertures, a plurality of signal strips each extending through a pair of said apertures transversely of said strip in slidable engagement with said shoulders, the central portion of each signal being engaged on the front side of said strip between said apertures and opposite end portions being engaged on the rear side of said strip, a guide and retaining section attached to said strip along one longitudinal edge and overlying the adjacent marginal portion between said edge and the adjacent row of apertures for retaining and guiding said signals on said strip and limiting movement of said signals in non-signalling position, and a flange extending in substantially perpendicular relation from the opposite longitudinal edge of said strip for limiting movement of said signals in signalling position and for cooperating with the edge of a visible index card to align said device with the visible index margin of said card for selective signalling cooperation of said signals with said visible margin.

References Cited in the file of this patent

UNITED STATES PATENTS

| | | |
|---|---|---|
| 2,232,193 | Wassell | Feb. 18, 1941 |
| 2,297,682 | Atwood | Oct. 6, 1942 |
| 2,391,080 | Vaucher | Dec. 18, 1945 |

FOREIGN PATENTS

| | | |
|---|---|---|
| 649,443 | Germany | 1937 |
| 257,630 | Switzerland | Apr. 1, 1949 |
| 275,165 | Switzerland | 1951 |
| 655,289 | Great Britain | 1951 |